US009426274B2

(12) United States Patent
Morgan et al.

(10) Patent No.: US 9,426,274 B2
(45) Date of Patent: Aug. 23, 2016

(54) DEVICE, METHOD, AND SYSTEM FOR PORTABLE CONFIGURATION OF VEHICLE CONTROLS

(71) Applicant: Intel Corporation, Santa Clara, CA (US)

(72) Inventors: Dennis M. Morgan, Pine Grove, CA (US); Alan D. Ross, Shingle Springs, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/629,119

(22) Filed: Sep. 27, 2012

(65) Prior Publication Data

US 2014/0088793 A1 Mar. 27, 2014

(51) Int. Cl.
*B60R 16/037* (2006.01)
*H04M 1/725* (2006.01)

(52) U.S. Cl.
CPC ......... *H04M 1/72533* (2013.01); *B60R 16/037* (2013.01)

(58) Field of Classification Search
CPC .. B60R 25/00; B60R 25/246; B60R 16/0231; G01C 21/36; G01C 21/00; G01C 21/3664; H04M 3/53; H04M 1/72577; H04M 3/42136; H04M 1/6091; H04W 4/001; E05B 81/78; G06F 3/04886; G06F 21/32; G07C 9/00087
USPC .................... 701/2, 36, 533; 340/545.7, 5.83; 455/418, 425; 715/706; 235/384; 704/273
See application file for complete search history.

(56) References Cited

U.S. PATENT DOCUMENTS

| 6,314,401 | B1 * | 11/2001 | Abbe ................. G07C 9/00087 704/272 |
| 2007/0171057 | A1 * | 7/2007 | Ogino .................. B60R 25/246 340/545.7 |
| 2007/0199987 | A1 * | 8/2007 | Takamura ........... B60R 16/0231 235/384 |
| 2009/0144622 | A1 * | 6/2009 | Evans ................. G06F 3/04886 715/706 |
| 2011/0115606 | A1 * | 5/2011 | Fu ........................... G06F 21/32 340/5.83 |
| 2011/0137520 | A1 * | 6/2011 | Rector .............. H04M 1/72577 701/36 |
| 2012/0094657 | A1 * | 4/2012 | Gullapalli ........... H04M 1/6091 455/425 |
| 2012/0109451 | A1 * | 5/2012 | Tan ..................... G01C 21/3664 701/36 |
| 2012/0172012 | A1 | 7/2012 | Sumcad et al. |
| 2012/0214470 | A1 * | 8/2012 | Tadayon ................. H04M 3/53 455/418 |
| 2013/0197674 | A1 | 8/2013 | Lowry |

FOREIGN PATENT DOCUMENTS

WO 2014052651 A1 4/2014

OTHER PUBLICATIONS

"OnStar," Wikipedia, The Free Encyclopedia, retrieved from: <http://en.wikipedia.org/w/index.php?title=OnStar&oldid=461637591>, edited Nov. 20, 2011, 5 pages.

(Continued)

*Primary Examiner* — Yuri Kan
(74) *Attorney, Agent, or Firm* — Barnes & Thornburg LLP

(57) ABSTRACT

A device, method, and system for portable configuration of vehicle controls includes a mobile communication device configured to communicate with an in-vehicle computing system of a vehicle. The mobile communication device stores user vehicle configuration settings, which are selectively transmitted to the in-vehicle computing system to cause the in-vehicle computing system to adjust vehicle controls based on the user vehicle configuration settings.

26 Claims, 7 Drawing Sheets

(56) References Cited

OTHER PUBLICATIONS

"Automotive electronics," Wikipedia, The Free Encyclopedia, retrieved from: <http://en.wikipedia.org/w/index.php?title=Automotive_electronics&oldid=458283111>, edited Oct. 31, 2011, 4 pages.

"In car entertainment," Wikipedia, The Free Encyclopedia, retrieved from: <http://en.wikipedia.org/w/index.php?title=In_car_entertainment&oldid=457701186>, edited Oct. 27, 2011, 2 pages.

"Automotive navigation system," Wikipedia, The Free Encyclopedia, retrieved from: <http://en.wikipedia.org/w/index.php?title=Automotive_navigation_system&oldid=457353694>, edited Oct. 25, 2011, 9 pages.

International Search Report and Written Opinion received for PCT Patent Application No. PCT/US2013/062010, mailed on Dec. 17, 2013, 11 pages.

\* cited by examiner

DEVICE, METHOD, AND SYSTEM FOR PORTABLE CONFIGURATION OF VEHICLE CONTROLS

BACKGROUND

Mobile communication devices are becoming ubiquitous tools for personal, business, and social uses. While the main use for mobile communication devices likely remains communication, the processing power and storage of modern mobile communication devices continues to increase thereby allowing advance processing and data storage to occur on such devices. For example, many users of modern "smart phones" utilize those phones both for communication and as computer platforms for storing personal, business, and social data, and executing various software applications. The mobility of such communication devices provides the benefit of allowing a user's data to travel with the individual.

Contemporary motor vehicles often include extra controls to allow personal configuration of various features of the vehicle. Such controls may include ergonomic controls that allow a vehicle occupant to, for example, adjust the viewing angle of the side mirrors, modify the tilt of the steering wheel, position the seat in numerous directions, modify the height of the pedals, and/or control other ergonomic features of the motor vehicle that may improve the human-interfacing of the motor vehicle. Additionally, the extra controls may include comfort controls that allow the vehicle occupant to, for example, preset a number of radio stations, set climate control targets, adjust window positioning, set defaults or enter data to various electronic sub-systems (e.g., a navigation system) of the vehicle, and/or control other control features of the motor vehicle that may improve the comfort of the vehicle occupant. The extra controls may also include mechanical controls that allow the vehicle occupant to, for example, modify the power mapping of an engine of the vehicle, adjust the shift schedule of a transmission of the vehicle, select a performance mode of the vehicle, and/or other mechanical features of the motor vehicle that may adjust or modify the performance or operational state of the vehicle.

Generally, a vehicle occupant must interface with the various controls via a switch, button, knob, touch screen, or other physical input device of the vehicle. As such, the vehicle occupant must first enter the vehicle and subsequently spend the time to adjust all of the various controls. Such manual adjustment can become cumbersome in those situations in which multiple drivers operate the vehicle at different times, which requires each driver (or passenger) to readjust the controls to their personal settings after every use of the vehicle by another driver (or passenger).

BRIEF DESCRIPTION OF THE DRAWINGS

The concept described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
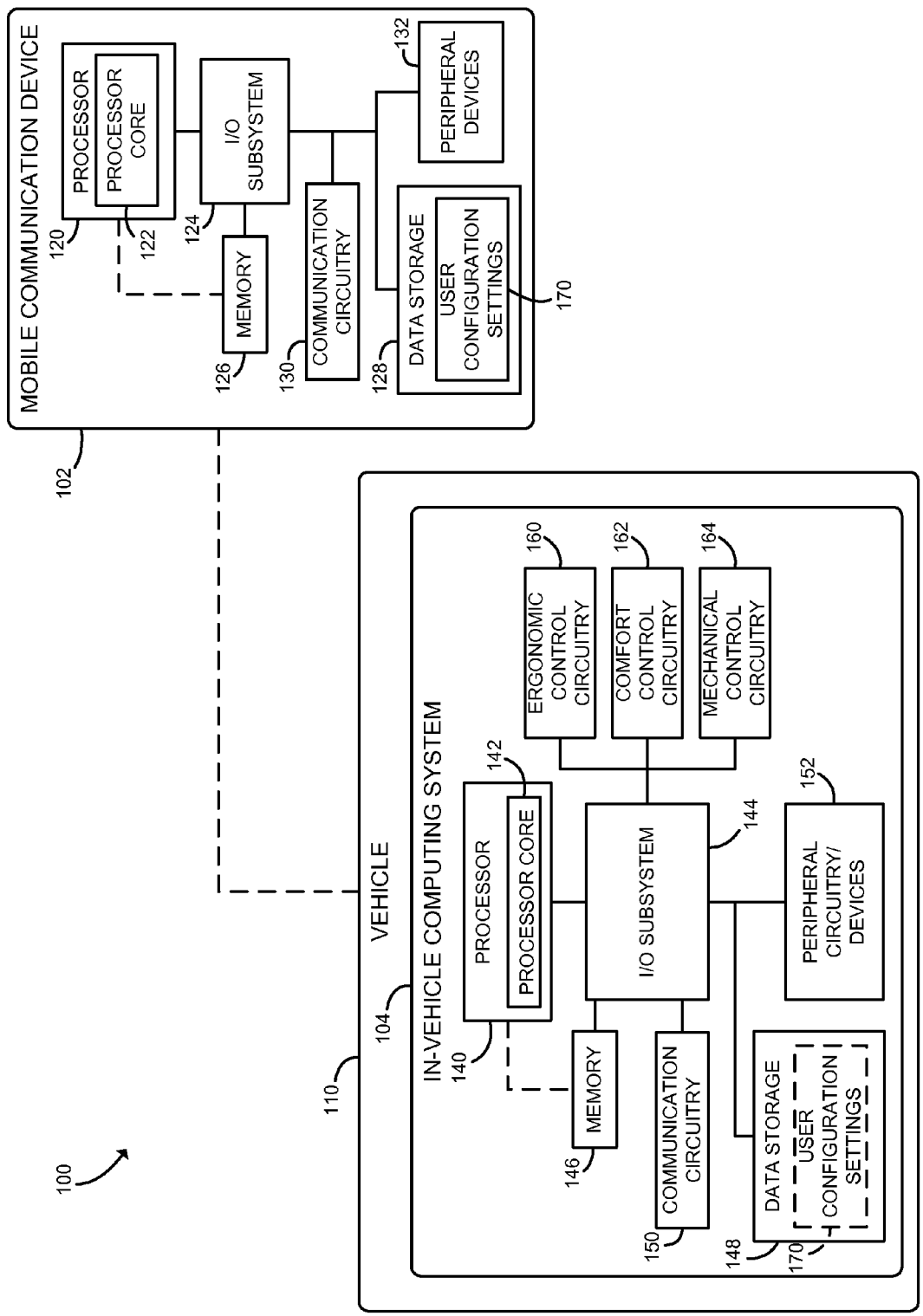
FIG. 1 is a simplified block diagram of at least one embodiment of a system for the portable configuration of controls of a vehicle.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions carried by or stored on a transitory or non-transitory machine-readable (e.g., computer-readable) medium, which may be read and executed by one or more processors. A machine-readable medium may be embodied as any device, mechanism, or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, electrical signals, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, in one embodiment, a system 100 for the portable configuration of vehicle occupant controls of a vehicle 110 includes a mobile communication device 102 and an in-vehicle computing system 104, which is located in the vehicle 110. As discussed in more detail below, the mobile communication device 102 maintains user vehicle configuration settings for vehicle occupant controls (e.g., ergonomic, comfort, and/or mechanical controls) of the vehicle 110 and communicates such user vehicle configuration settings to the in-vehicle computing system 104. In response, the in-vehicle computing system 104 implements the user vehicle configuration settings to adjust the vehicle occupant controls. In this way, a user of the mobile communication device 102 may quickly and automatically adjust the vehicle occupant controls to his/her liking without the need of manually adjusting each control. Additionally, because the mobile communication device 102 stores the user configuration settings, the user need not remember the amount or level of adjustment the user has determined, through experience or knowledge, to be optimal for him/her. Further, as the mobile communication device 102 can store multiple user vehicle configuration settings, the mobile communication device 102 may be used to interface with in-vehicle computing systems of different vehicles to adjust vehicle occupant controls based user settings from the same or different users of the mobile communication device 102.

The mobile communication device 102 may be embodied as any type of mobile communication device capable of communicating with the in-vehicle computing system 104 and performing the functions described herein. For example, the mobile communication device 102 may be embodied as, but not limited to, a smart phone, a tablet computer, a notebook computer, a mobile internet device, a mobile computing device, a personal digital assistant, a cellular phone, a messaging device, a laptop computer, a portable data storage device having communication capabilities, and/or other portable computing devices capable of communicating with the in-vehicle computing system 104. Of course, it should be appreciated that the system 100 may include additional mobile communication devices 102 in some embodiments. For example, each occupant of the vehicle 110 may have a mobile communication device having similar features as those described below with regard to the mobile communication device 102 and configured to perform similar functions.

In the illustrative embodiment of FIG. 1, the mobile communication device 102 includes a processor 120, an I/O subsystem 124, a memory 126, a data storage 128, a communication circuitry 130, and one or more peripheral devices 132. In some embodiments, several of the foregoing components may be incorporated on a motherboard or main board of the mobile communication device 102, while other components may be communicatively coupled to the motherboard via, for example, a peripheral port. Furthermore, it should be appreciated that the mobile communication device 102 may include other components, sub-components, and devices commonly found in a computer and/or computing device, which are not illustrated in FIG. 1 for clarity of the description.

The processor 120 of the mobile communication device 102 may be embodied as any type of processor capable of executing software/firmware, such as a microprocessor, digital signal processor, microcontroller, or the like. The processor 120 is illustratively embodied as a single core processor having a processor core 122. However, in other embodiments, the processor 120 may be embodied as a multi-core processor having multiple processor cores 122. Additionally, the mobile communication device 102 may include additional processors 120 having one or more processor cores 122.

The I/O subsystem 124 of the mobile communication device 102 may be embodied as circuitry and/or components to facilitate input/output operations with the processor 120 and/or other components of the mobile communication device 102. In some embodiments, the I/O subsystem 124 may be embodied as a memory controller hub (MCH or "northbridge"), an input/output controller hub (ICH or "southbridge"), and a firmware device. In other embodiments, the I/O subsystem 124 may be embodied as a platform controller hub (PCH). In such embodiments, the memory controller hub (MCH) may be incorporated in or otherwise associated with the processor 120, and the processor 120 may communicate directly with the memory 126 (as shown by the hashed line in FIG. 1). Additionally, in other embodiments, the I/O subsystem 124 may form a portion of a system-on-a-chip (SoC) and be incorporated, along with the processor 120 and other components of the mobile communication device 102, on a single integrated circuit chip.

The processor 120 is communicatively coupled to the I/O subsystem 124 via a number of signal paths. Those signal paths (and other signal paths illustrated in FIG. 1) may be embodied as any type of signal paths capable of facilitating communication between the various components of the mobile communication device 102. For example, the signal paths may be embodied as any number of point-to-point links, wires, cables, light guides, printed circuit board traces, vias, bus, intervening devices, and/or the like.

The memory 126 of the mobile communication device 102 may be embodied as, or otherwise include, one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The memory 126 is communicatively coupled to the I/O subsystem 124 via a number of signal paths. Although only a single memory device 126 is illustrated in FIG. 1, the mobile communication device 102 may include additional memory devices in other embodiments. Various data and software may be stored in the memory 126. For example, one or more operating systems, applications, programs, libraries, and drivers that make up the software stack executed by the processor 120 may reside in memory 126 during execution.

The data storage 128 may be embodied as any type of device or devices configured for the short-term or long-term storage of data such as, for example, memory devices and circuits, memory cards, hard disk drives, solid-state drives, or other data storage devices. In the illustrative embodiment, the mobile communication device 102 maintains one or more user vehicle configuration settings 170 in the data storage 128. As discussed in more detail below, the user vehicle configuration settings 170 is embodied as data usable by the in-vehicle computing system 104 to adjust various vehicle occupant controls. The particular make-up and format of the user vehicle configuration settings 170 may vary depending on, for example, the type of vehicle 110, the type of in-vehicle computing system 104, the type and number of vehicle occupant controls of the vehicle 110, and/or other features or factors related to the vehicle 110. Additionally, it should be appreciated that the mobile communication device 102 may store a plurality of user configuration settings 170 in data storage 128, such as user vehicle configuration settings for different users and/or different vehicles.

The communication circuitry 130 of the mobile communication device 102 may include any number of devices and circuitry for enabling communications between the mobile communication device 102 and the in-vehicle computing system 104 as discussed in more detail below. The communication circuitry 130 may be configured to use any one or more communication technology and associated protocols to communicate with the in-vehicle computing system 104. For example, in one particular embodiment, the communication circuitry 130 is embodied as a wireless communication circuitry configured to communicate with the in-vehicle computing system 104 using a wireless communication protocol such as Bluetooth®, Wi-Fi®, WiMAX, and/or other wireless communication circuitry.

In some embodiments, the mobile communication device 102 may also include one or more peripheral devices 132. Such peripheral devices 132 may include any number of additional input/output devices, interface devices, and/or other peripheral devices. For example, the peripheral devices 132 may include a display, a graphics circuitry, a keypad or keyboard, a speaker, and/or other input/output devices, interface devices, and/or peripheral devices.

The in-vehicle computing system 104 may be embodied as any type of vehicle computing system capable of performing the functions described herein. For example, the in-vehicle computing system 104 may be embodied as, or otherwise include, an in-vehicle occupant controls system, an in-vehicle infotainment system, and/or other in-vehicle computing system or sub-system. In the illustrative embodiment of FIG. 1, the in-vehicle computing system includes a processor 140, an I/O subsystem 144, a memory 146, a data storage 148, communication circuitry 150, and one or more peripheral devices 152. Of course, it should be appreciated that the in-vehicle computing system 104 may include other components, sub-components, and devices commonly found in in-vehicle computing system 104 and similar computing systems, which are not illustrated in FIG. 1 for clarity of the description.

The processor 140 of the in-vehicle computing system 104 may be embodied as any type of processor or processing circuitry capable of executing software/firmware, such as a microprocessor, digital signal processor, microcontroller, or the like. The processor 140 is illustratively embodied as a single core processor having a processor core 142. However, in other embodiments, the processor 140 may be embodied as a multi-core processor having multiple processor cores 142. Additionally, the in-vehicle computing system 104 may include additional processors 140 having one or more processor cores 142.

The I/O subsystem 144 of the in-vehicle computing system 104 may be embodied as circuitry and/or components to facilitate input/output operations with the processor 140 and/or other components of the in-vehicle computing system 104. In some embodiments, the I/O subsystem 144 may be embodied as a memory controller hub (MCH or "northbridge"), an input/output controller hub (ICH or "southbridge"), and a firmware device. In other embodiments, the I/O subsystem 144 may be embodied as a platform controller hub (PCH). In such embodiments, the memory controller hub (MCH) may be incorporated in or otherwise associated with the processor 140, and the processor 140 may communicate directly with the memory 146 (as shown by the hashed line in FIG. 1). Additionally, in other embodiments, the I/O subsystem 144 may form a portion of a system-on-a-chip (SoC) and be incorporated, along with the processor 140 and other components of the in-vehicle computing system 104, on a single integrated circuit chip.

The processor 140 is communicatively coupled to the I/O subsystem 144 via a number of signal paths. Those signal paths (and other signal paths illustrated in FIG. 1) may be embodied as any type of signal paths capable of facilitating communication between the various components of the in-vehicle computing system 104. For example, the signal paths may be embodied as any number of point-to-point links, wires, cables, light guides, printed circuit board traces, vias, bus, intervening devices, and/or the like.

The memory 146 of the in-vehicle computing system 104 may be embodied as, or otherwise include, one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The memory 146 is communicatively coupled to the I/O subsystem 144 via a number of signal paths. Although only a single memory device 146 is illustrated in FIG. 1, the in-vehicle computing system 104 may include additional memory devices in other embodiments. Various data and software may be stored in the memory 146. For example, one or more operating systems, applications, programs, libraries, and drivers that make up the software stack executed by the processor 140 may reside in memory 146 during execution.

The data storage 148 may be embodied as any type of device or devices configured for the short-term or long-term storage of data such as, for example, memory devices and circuits, memory cards, hard disk drives, solid-state drives, or other data storage devices. In the illustrative embodiment, the in-vehicle computing system 104 may store user vehicle configuration settings 170 in the data storage 148.

The communication circuitry 150 of the in-vehicle computing system 104 may include any number of devices and circuitry for enabling communications between the in-vehicle computing system 104 and the mobile communication device 102. As discussed above with regard to the communication circuitry 130, the communication circuitry 150 may be configured to use any one or more communication technology and associated protocols to communicate with the mobile communication device 102. As such, in one particular embodiment, the communication circuitry 150 is embodied as a wireless communication circuitry configured to communicate with the in-vehicle computing system 104 using a wireless communication protocol such as Bluetooth®, Wi-Fi®, WiMAX, and/or other wireless communication circuitry.

The in-vehicle computing system 104 may also include one or more peripheral devices 132. Such peripheral devices 132 may include any number of additional input/output devices, interface devices, and/or other peripheral devices. For example, the peripheral devices 132 may include a display, a graphics circuitry, a keypad or keyboard, a speaker, and/or other input/output devices, interface devices, and/or peripheral devices.

In some embodiments, the in-vehicle computing system 104 may also include one or more ergonomic control circuitry 160, comfort control circuitry 162, and/or mechanical control circuitry 164. Each of the circuitries 160, 162, 164 is configured to control corresponding vehicle occupant controls. For example, the ergonomic control circuitry 160 may control any one or more ergonomic control of the vehicle 110. Such ergonomic controls may include, but are not limited to, the viewing angle controls of the side mirrors, steering wheel tilt controls, vehicle seat positioning controls, pedal positioning controls, shifter positioning controls, and/or controls for adjusting any other ergonomic feature of the vehicle 110 that may modify and/or improve the human-interfacing of the vehicle 110. The comfort control circuitry 162 may control any one or more comfort control of the vehicle 110. Such comfort controls may include, but are not limited to, temperature controls, radio controls, window controls, volume controls, backup indicator controls, internal lighting controls, and/or controls for adjusting any other comfort feature of the vehicle 110 that may modify and/or improve the comfort of a vehicle occupant. The mechanical control circuitry 164 may control any one or more mechanical control of the vehicle 110. Such mechanical controls may include, but are not limited to, engine power mapping controls, vehicle performance mode controls, acceleration curve controls, and/or controls for adjusting any other mechanical feature of the vehicle 110 vehicle that may modify and/or improve the performance or operational state of the vehicle 110.

Figure 2:
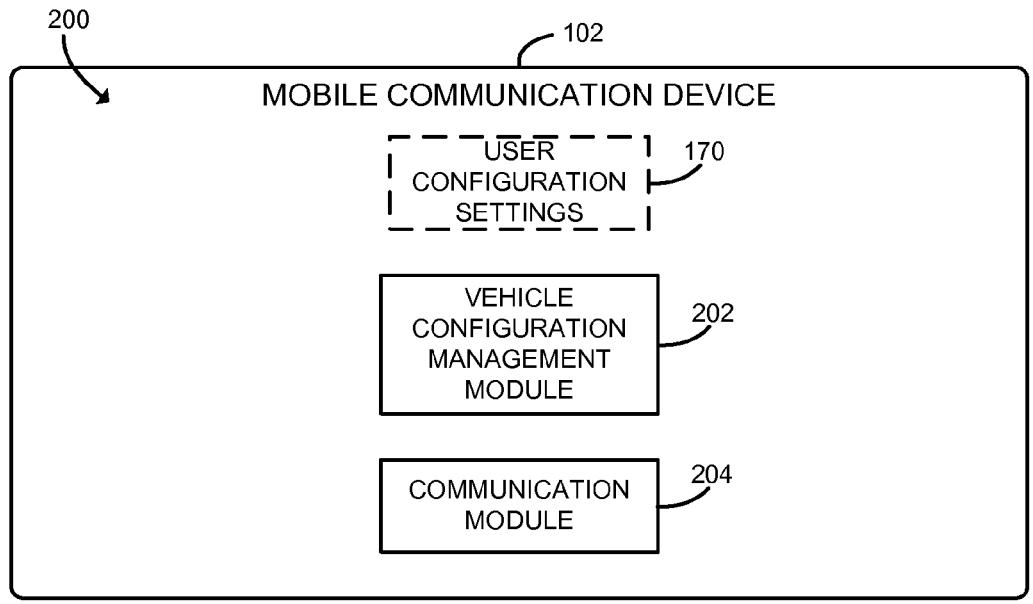
FIG. 2 is a simplified block diagram of at least one embodiment of an environment of a mobile communication device of the system of FIG. 1.

Referring now to FIG. 2, in one embodiment, the mobile communication device 102 may establish an environment 200 during operation. The illustrative environment 200 includes a vehicle configuration management module 202 and a communication module 204, each of which may be embodied as software, firmware, hardware, or a combination thereof. As discussed in more detail below, the vehicle configuration management module 202 is configured to maintain the user vehicle configuration settings 170 and communicate with the in-vehicle computing system 104, via the communication module 204, to transfer the user vehicle configuration settings 170, or an identifier of such settings, thereto. Additionally, the vehicle configuration management module 202 may communicate with the in-vehicle computing system 104, via the communication module 204, to receive new or current vehicle configuration settings of the vehicle 110 and store such current settings in the data storage 128. Further, in embodiments in which multiple user vehicle configuration settings 170 are stored on the mobile communication device 102, the vehicle configuration management module 202 may provide for user selection of one or more of the plurality of stored user vehicle configuration settings 170.

Figure 3:
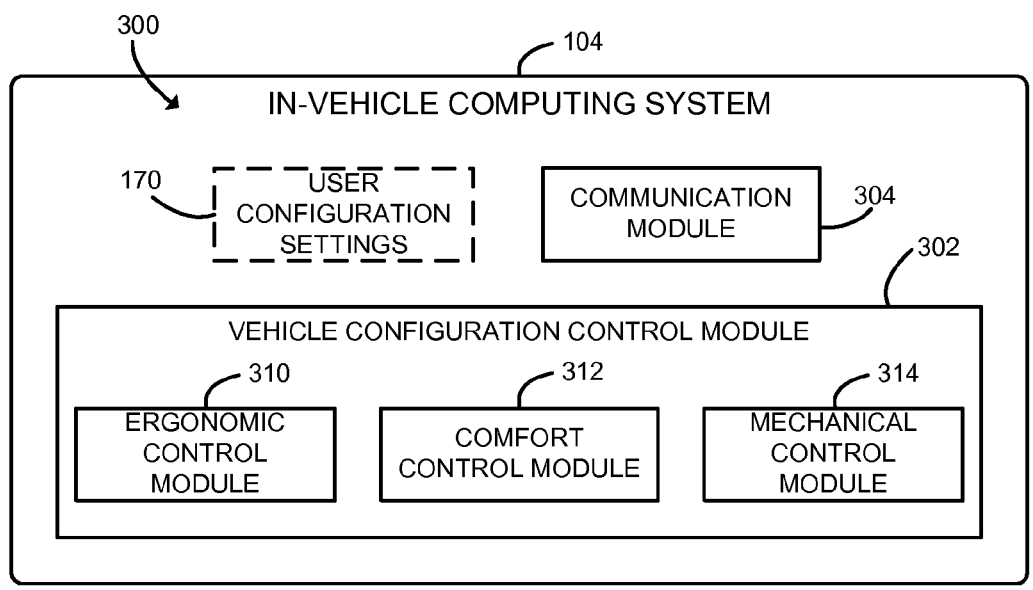
FIG. 3 is a simplified block diagram of at least one embodiment of an environment of an in-vehicle computing system of the system of FIG. 1.

Referring now to FIG. 3, in one embodiment, the in-vehicle computing system 104 may establish an environment 300 during operation. The illustrative environment 300 includes a vehicle configuration management module 202 and a communication module 304, each of which may be embodied as software, firmware, hardware, or a combination thereof. The vehicle configuration management module 202 is configured to monitor, manage, and control various vehicle occupant controls of the vehicle. For example, in the illustrative embodiment, the vehicle configuration control module 302 may include an ergonomic control module 310 to control the ergonomic control circuitry 160, a comfort control module 312 to control the comfort control circuitry 162, and/or a mechanical control module 314 to control the mechanical control circuitry 164. As discussed in more detail below, the vehicle configuration control module 302 may communicate, via the communication module 304, with the mobile communication device 102 to receive and/or transfer vehicle configuration settings.

Figure 4:
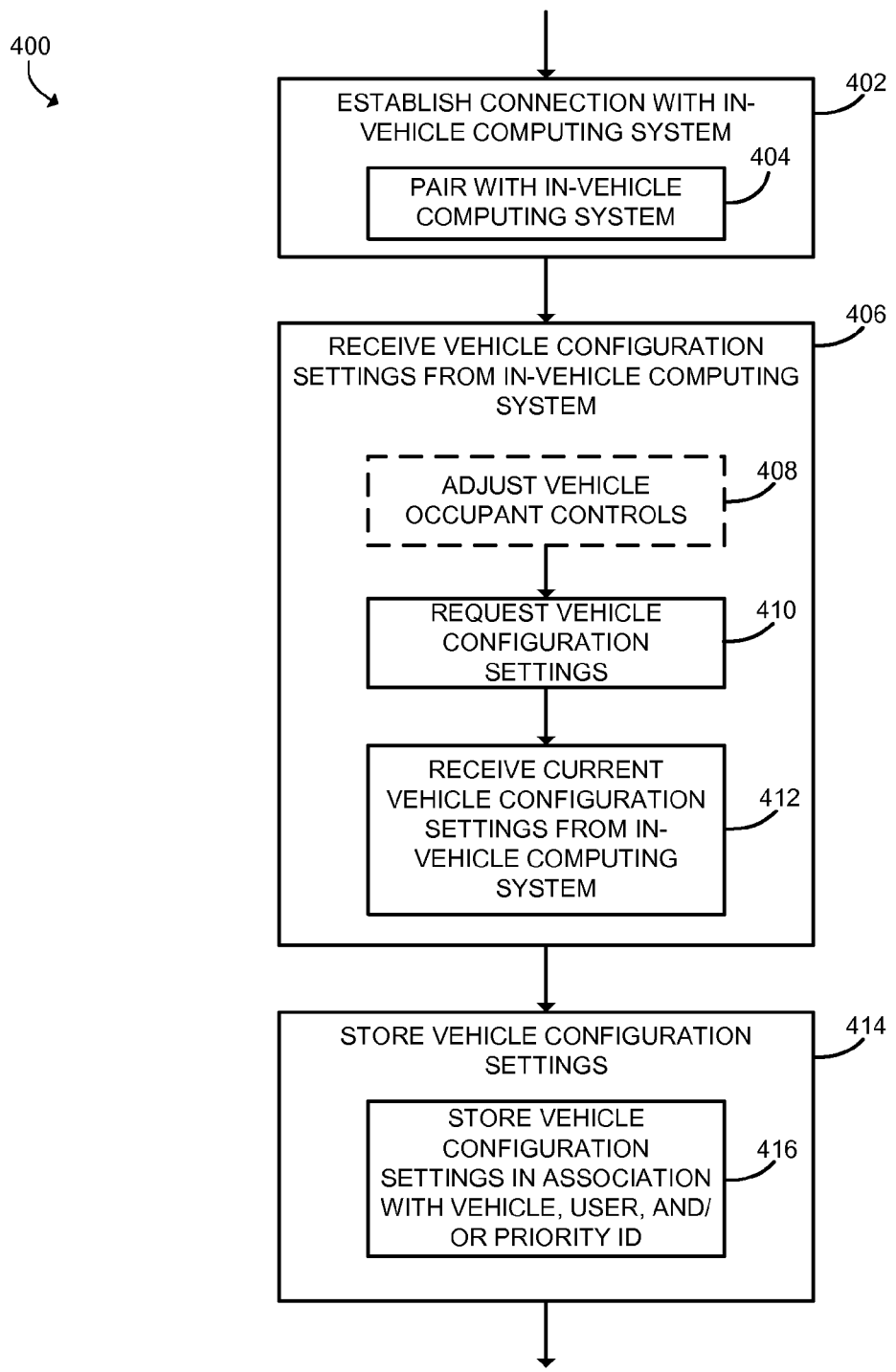
FIG. 4 is a simplified flow diagram of at least one embodiment of a method for retrieving vehicle configuration settings from an in-vehicle computing system, which may be executed by the mobile communication device of FIG. 2.

Referring now to FIG. 4, in use, the mobile communication device 102 may execute a method 400 for retrieving vehicle configuration settings from the in-vehicle computing system 104. The method 400 begins with block 402 in which the mobile communication device 102 establishes a connection with the in-vehicle computing system 104. As discussed above, the communication circuitries 130, 150 may use any suitable communication technology and protocol to communicate with each other. In some embodiments, the mobile communication device 102 may perform a pairing process in block 404 to pair with the in-vehicle computing system 104 to establish a communication link therebetween.

In block 406, the mobile communication device 102 receives the current vehicle configuration settings from the in-vehicle computing system 104. As discussed above, the vehicle configuration settings may be embodied as any type of data usable by the in-vehicle computing system 104 to adjust various vehicle occupant controls. In some embodiments, the user of the mobile communication device 102 may initially manually adjust one or more vehicle occupant controls in block 408 to the user's liking. For example, the user may adjust the seat positioning, the temperature control, and the performance mode of the vehicle 110. After the user has adjusted the vehicle occupant controls to his/her liking, the user may operate the mobile communication device 102 to request the current vehicle configuration settings from the in-vehicle computing system 104 in block 410. Subsequently, in block 412, the mobile communication device 102 receives the current vehicle configuration settings from the in-vehicle computing system 104. In some embodiments, the mobile communication device 102 may receive only recently modified or updated vehicle configuration settings (e.g., only settings for those vehicle occupant controls adjusted within a pre-defined time period). Alternatively, the mobile communication device 102 may receive a complete set of current vehicle configuration settings in block 406.

In block 406, the mobile communication device 102 stores the current vehicle configuration settings as user vehicle configuration settings 170 in the data storage 128. In some embodiments, the user vehicle configuration settings 170 may be stored in association with other data in block 416. For example, the user vehicle configuration settings 170 may be stored in association with a vehicle identifier that identifies the vehicle 110 (e.g., uniquely identifies the vehicle 110 from other vehicles for which user vehicle configuration settings have been stored in the data storage 128). Additionally or alternatively, the user vehicle configuration settings 170 may be stored in association with a user identifier that identifies the current user of the mobile communication device 102. Further, in some embodiments, the user vehicle configuration settings 170 may be stored in association with a priority identifier that identifies a priority of the user vehicle configuration settings 170 relative to other user vehicle configuration settings 170 (which may be stored on the mobile communication device 102 or another mobile communication device). As discussed in more detail below, the priority identifier may be used by the in-vehicle computing system 104 to resolve conflicts between user vehicle configuration settings (e.g., when two users transmit two conflicting user vehicle configuration settings 170 to the in-vehicle computing system 104).

Figure 5:
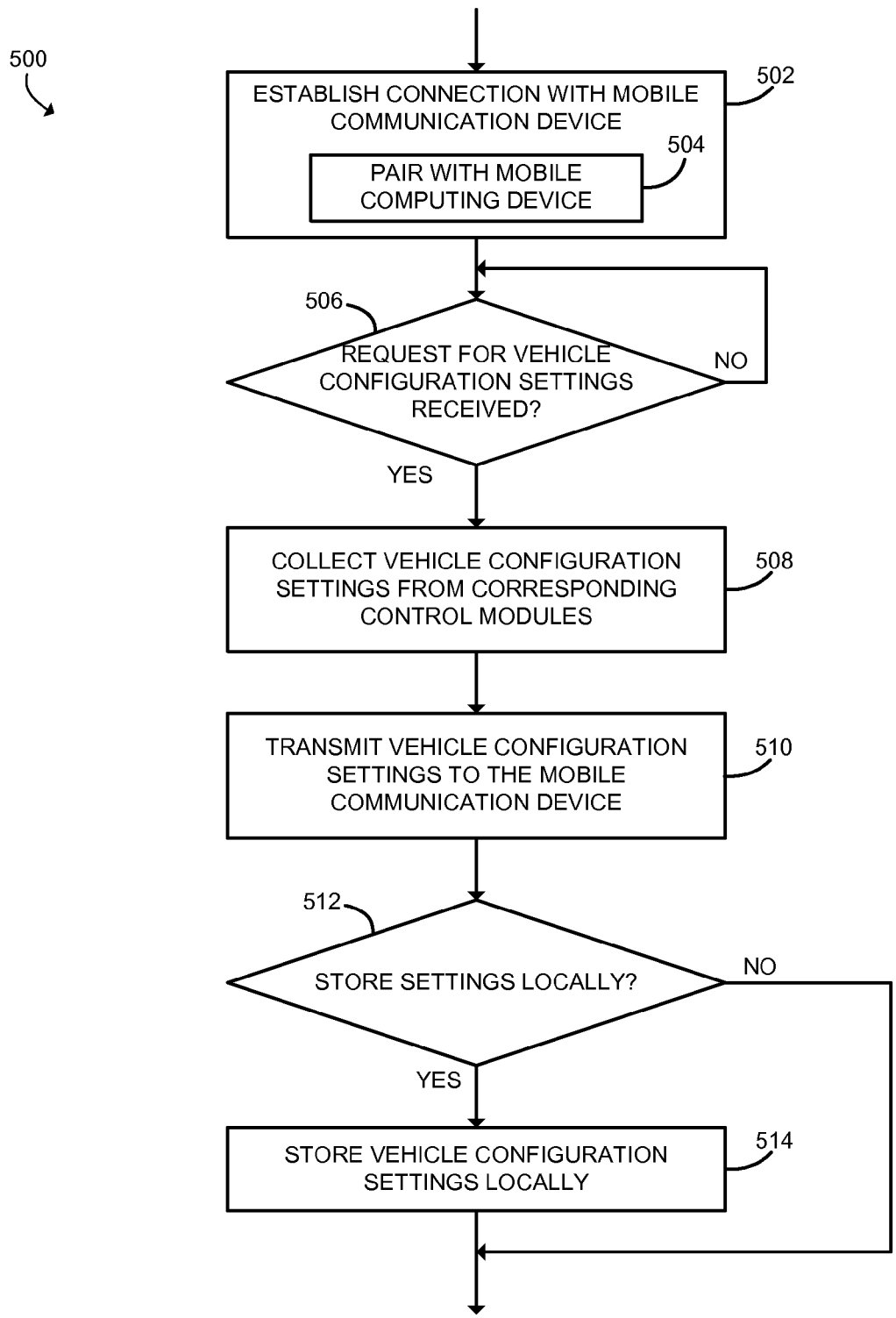
FIG. 5 is a simplified flow diagram of at least one embodiment of a method for communicating vehicle configuration settings to a mobile communication device, which may be executed by the in-vehicle system of FIG. 3.

Referring now to FIG. 5, in use, the in-vehicle computing system 104 may execute a method 500 for collecting and communicating vehicle configuration settings to the mobile communication device 102. The method 500 begins with block 502 in which the in-vehicle computing system 104 establishes a connection with the mobile communication device 102. As discussed above, the communication circuitries 130, 150 may use any suitable communication technology and protocol to communicate with each other. In some embodiments, the in-vehicle computing system 104 may perform a pairing process to block 504 to pair with the mobile communication device 102 to establish a communication link therebetween.

In block 506, the in-vehicle computing system 104 determines whether a request for the current vehicle configuration settings of the vehicle 110 has been received from the mobile communication device 102. If so, the method 500 advances to block 508 in which the in-vehicle computing system 104 collects the current vehicle configuration settings. To do so, the vehicle configuration control module 302 may communicate with the various vehicle occupant controls, via the corresponding control module 310, 312, 314, to retrieve the current setting or data indicative of the current setting or adjustment of the corresponding vehicle occupant control. For example, the vehicle configuration control module 302 may communicate with a seat positioning control module to determine data indicative of the current seat position or adjustment in block 508. It should be appreciated that the in-vehicle computing system 104 may query, or otherwise communicate, with every, some, or just one vehicle occupant control to determine one or more vehicle configuration settings in block 508.

In block 510, the in-vehicle computing system 104 transmits the current vehicle configuration settings to the mobile communication device 102. Additionally, in some embodiments, the in-vehicle computing system 104 may determine whether local storage of the current vehicle configuration settings is required in block 512. If so, the in-vehicle computing system 104 stores the current vehicle configuration settings in the local data storage 148 in block 514. The in-vehicle computing system 104 may store such vehicle configuration settings in association with a user identifier and/or a priority identifier as discussed above with regard to the mobile communication device 102. In embodiments in which the vehicle configuration settings are stored in the data storage 148, the in-vehicle computing system 104 may transmit a vehicle configuration settings identifier to the mobile communication device 102 in block 510, rather than the complete current vehicle configuration settings. In such embodiments, the vehicle configuration settings identifier uniquely identifies the current vehicle configuration settings from other vehicle configuration settings stored in the data storage 148. Additionally, in such embodiments, the mobile communication device 102 need only transmit the vehicle configuration settings identifier to the in-vehicle computing system 104, rather than the complete user vehicle configuration settings, which is used by the in-vehicle computing system 104 to fetch the corresponding user vehicle configuration settings from the data storage 148 as discussed in more detail below.

Figure 6:
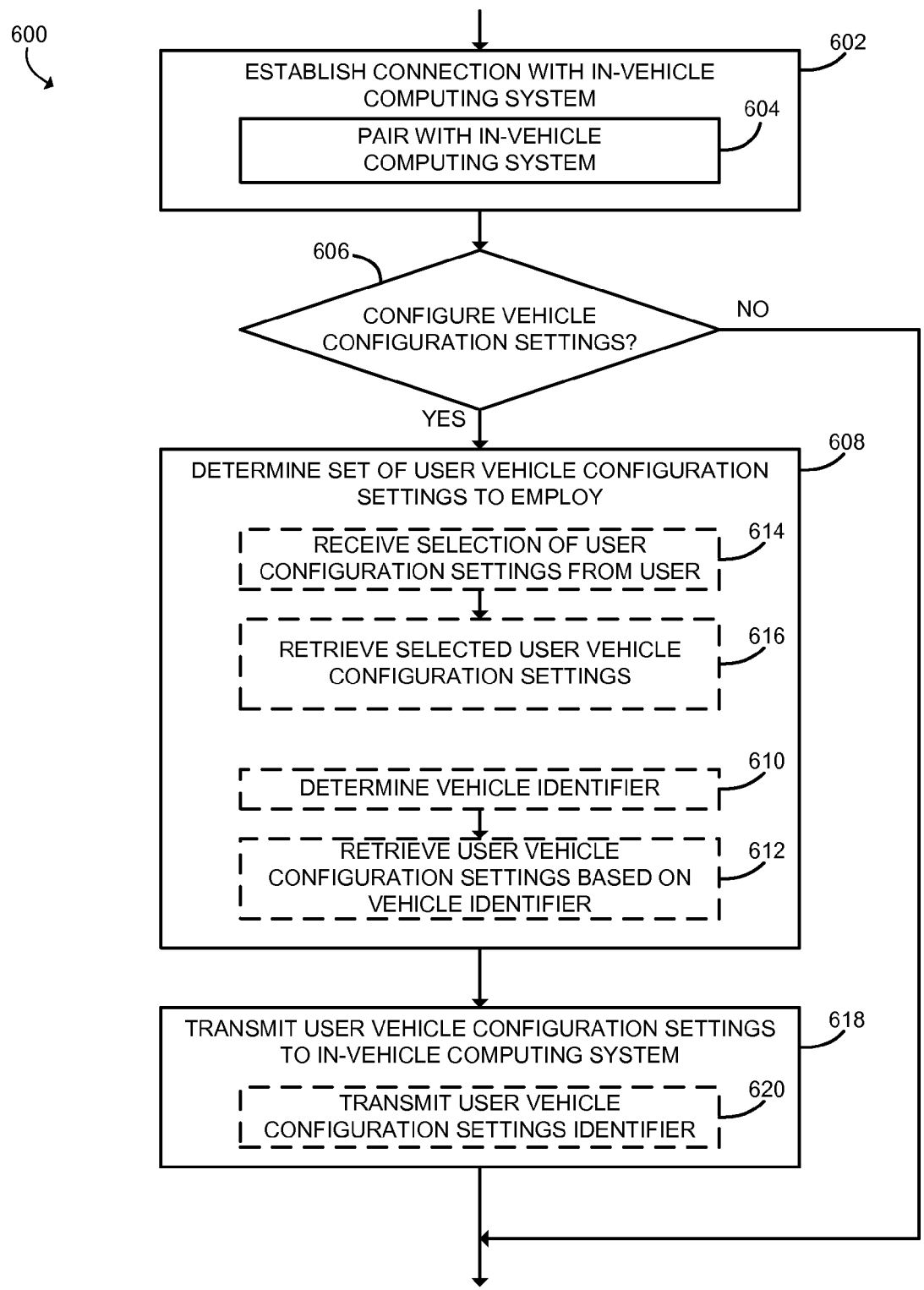
FIG. 6 is a simplified flow diagram of at least one embodiment of a method for configure vehicle configuration settings of the in-vehicle computing system, which may be executed by the mobile communication device of FIG. 2.

Referring now to FIG. 6, in use, the mobile communication device 102 may also execute a method 600 for configuring vehicle configuration settings of the in-vehicle computing system 104. The method 600 begins with block 602 in which the mobile communication device 102 establishes a connection with the in-vehicle computing system 104. As discussed above with regard to block 404 of the method 400, the mobile communication device 102 may perform a pairing process in block 404 to pair with the in-vehicle computing system 104 to establish a communication link therebetween.

In block 606, the mobile communication device 102 determines whether to configure the vehicle configuration settings of the vehicle 110. In some embodiments, the configuration of the vehicle settings may occur automatically or semi-automatically with little or no intervention by the user of the mobile communication device 102. For example, the mobile communication device 102 may automatically attempt to configure the vehicle configuration settings in response to the establishment of a communication connection with the in-vehicle computing system 104 in block 602 (i.e., in response to the mobile communication device 102 being brought into proximity with the in-vehicle computing system 104). Additionally or alternatively, the mobile communication device 102 may configure the vehicle configuration settings in response to receiving a configuration authorization signal from the in-vehicle computing system 104. As discussed in more detail below in regard to FIG. 7, such configuration authorization signal may be generated in response to activation of a component of the vehicle 110 such as the door handle, brake, ignition, or the like. In yet other embodiments, the user may manually opt to configure the vehicle configuration settings by selecting an appropriate command from a user interface of the mobile communication device 102.

Figure 8:
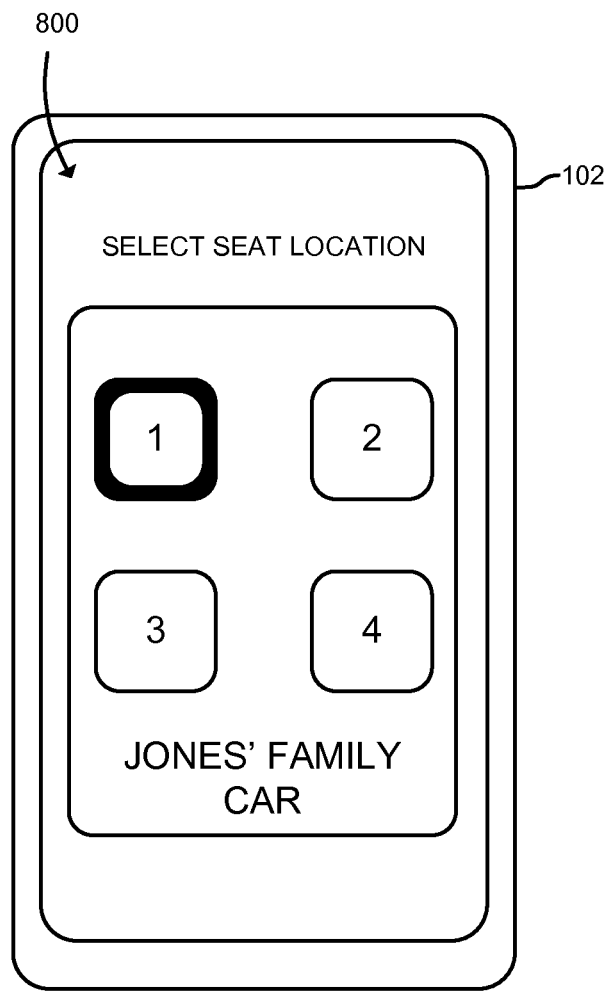
FIG. 8 is a simplified illustration of at least one embodiment of a graphical user interface that may be displayed on the mobile communication device of FIG. 2 during operation.

If the mobile computing device 102 determines that the vehicle configuration settings are to be configured, the method 600 advances to block 608 in which the set of user vehicle configuration settings 170 to transfer to the in-vehicle computing system 104 is determined. As discussed above, the mobile communication device 102 may store multiple sets of user vehicle configuration settings 170 in some embodiments. In such embodiments, the user of the mobile communication device 102 may display a graphical user interface on a display of the device 102 to allow the user to select the desired set of user vehicle configuration settings. For example, as shown in FIG. 8, the mobile communication device 102 may display a seating chart interface 800 that allows a user of the mobile communication device 102 to select his/her seating position within the vehicle 110. The mobile communication device 102 may have stored therein different user vehicle configuration settings for one or more different seating positions. For example, the user may select different seat positions for when he/she is the driver or a passenger in the vehicle 110.

Referring back to FIG. 6, the mobile communication device 102 receives the user's selection in block 614 and retrieves the selected user vehicle configuration settings in block 616. As discussed above, in some embodiments, the user vehicle configuration settings 170 may be embodied as a user vehicle configuration settings identifier, which may be retrieved in block 616, rather than a complete set of user vehicle configuration settings.

In some embodiments, the mobile communication device 102 may be configured to select automatically or semi-automatically the user vehicle configuration settings 170 from multiple user vehicle configuration settings stored on the mobile communication device 102. In such embodiments, the mobile communication device 102 may determine a vehicle identifier, which identifies the vehicle 110, in block 610. For example, the mobile communication device 102 may receive the vehicle identifier from the in-vehicle computing system 104 during the pairing process of block 604. Subsequently, in block 612, the mobile communication device 102 retrieves the user vehicle configuration settings form the data storage 128 corresponding to the vehicle identifier.

After the user vehicle configuration settings have been determined and retrieved in block 608, the mobile communication device 102 transmits the retrieved user vehicle configuration settings in block 518. As discussed above, rather than transmitting the complete user vehicle configuration settings, the mobile communication device 102 may transmit a user vehicle configuration settings identifier that identifies the selected or determined user vehicle configuration settings in block 620.

Figure 7:
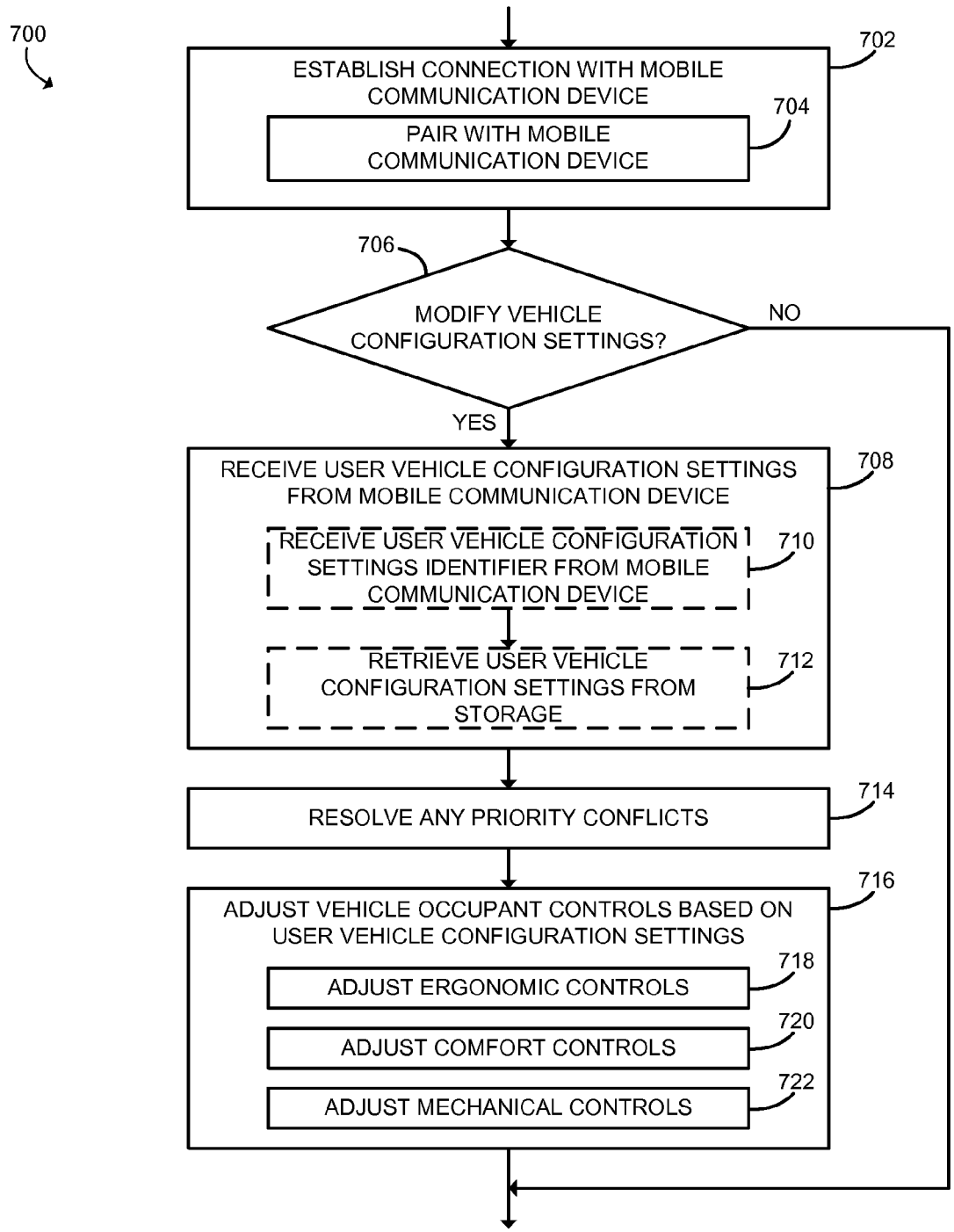
FIG. 7 is a simplified flow diagram of at least one embodiment of a method for adjusting vehicle controls based on user vehicle configuration settings, which may be executed by the in-vehicle system of FIG. 3.

Referring now to FIG. 7, in use, the in-vehicle computing system 104 may execute a method 700 for adjusting one or more vehicle occupant controls based on user vehicle configuration settings. The method 700 begins with block 702 in which the in-vehicle computing system 104 establishes a connection with the mobile communication device 102. As discussed above with regard to block 504 of the method 500, the in-vehicle computing system 104 may perform a pairing process in block 704 to pair with the mobile communication device 102 to establish a communication link therebetween.

In block 706, the in-vehicle computing system 104 determines whether to allow modification of the vehicle configuration settings. As discussed above, the vehicle configuration settings may be configured automatically or semi-automatically in some embodiments. For example, the in-vehicle computing system 104 may provide a period of time during which vehicle configuration settings may be automatically adjusted by the mobile communication device 102 in response to the establishment of the communication connection in block 702 (i.e., in response to the mobile communication device 102 being brought into proximity of the in-vehicle computing system 104). Additionally or alternatively, the in-vehicle computing system 104 may transmit a configuration authorization signal to the mobile communication device 102 to indicate that the mobile communication device 102 may modify the vehicle configuration settings if desired. In some embodiments, the configuration authorization signal may be generated in response to activation of a component of the vehicle 110 such as the lifting of a door handle, the depression of the break, selection of a particular button, activation of the ignition and/or other component of the vehicle 110. Yet further, in some embodiments, the vehicle computing system 104 may receive a request from the mobile communication device 102 to modify the vehicle configuration settings in block 706.

If the in-vehicle computing system 102 determines that the vehicle configuration settings are to be modified, the method 500 advances to block 708 in which the in-vehicle computing system 104 receives the user vehicle configuration settings 170 form the mobile communication device 102. As discussed above, rather than transmitting the complete user vehicle configuration settings 170, the mobile communication device 102 may transfer only a user vehicle configuration settings identifier that identifies the desired user vehicle configuration settings 170 (which are stored on the data storage 148 of the in-vehicle computing system 104). In such embodiments, the in-vehicle computing system 104 receives the user vehicle configuration settings identifier from the mobile communication device 102 in block 710 and retrieves the corresponding user vehicle configuration settings from the data storage 148 based on the user vehicle configuration settings identifier in block 712.

In block 714, the in-vehicle computing system 104 resolves any priority conflicts between different user vehicle configuration settings that may occur in response to the recent receive/retrieved user vehicle configuration settings 170. As discussed above, the in-vehicle computing system 104 may be configured to resolve such priority conflicts based on a priority identifier associated with each set of user vehicle configuration settings. That is, the user vehicle configuration settings 170, or components thereof, having the highest (or lowest) priority identifier may be used in place of other user vehicle configuration settings. In this way, one user's preference (e.g., a parent's preference) for vehicle configuration settings may override another user's preference (e.g., a child's preference).

In block 716, the in-vehicle computing system 104 adjusts one or more vehicle occupant controls based on, or as a function of, the user vehicle configuration settings 170 received/retrieved in block 708. For example, the in-vehicle computing system 104 may adjust ergonomic controls in block 718, comfort controls in block 720, and/or mechanical controls in block 722. In this way, a user of the mobile communication device 102 may remotely and automatically adjust the vehicle occupant controls to desired settings without manually adjusting each control.

Examples

Illustrative examples of the devices, systems, and methods disclosed herein are provided below. An embodiment of the devices, systems, and methods may include any one or more, and any combination of, the examples described below.

Example 1 includes a mobile communication device for remotely configuring vehicle configuration settings of a vehicle. The mobile communication device includes a data storage having stored therein a user vehicle configuration settings, the user vehicle configuration settings comprising data usable by an in-vehicle computing system to configure vehicle occupant controls of the vehicle; a vehicle configuration management module to retrieve the user vehicle configuration settings from the data storage and transmit the retrieved user vehicle configuration settings to the in-vehicle computing system to configure the vehicle occupant controls.

Example 2 includes the subject matter of Example 1, and wherein the vehicle configuration management module is to automatically retrieve and transmit the user vehicle configuration settings in response to establishment of a communication connection with the in-vehicle computing system.

Example 3 includes the subject matter of any of Examples 1 and 2, and wherein the vehicle configuration management module is to automatically retrieve and transmit the user vehicle configuration settings in response to receiving a configuration authorization signal from the in-vehicle computing system indicative that a component of the vehicle has been activated.

Example 4 includes the subject matter of any of Examples 1-3, and wherein the vehicle configuration management module to determine a vehicle identifier for the vehicle and retrieve the user vehicle configuration settings from the data storage as a function of the vehicle identifier.

Example 5 includes the subject matter of any of Examples 1-4, and wherein the vehicle configuration management module to receive the vehicle identifier from the in-vehicle computing system.

Example 6 includes the subject matter of any of Examples 1-5, and further including a display, wherein the vehicle configuration management module to display a selection of a plurality of selectable user vehicle configuration settings stored in the data storage on the display; receive a selection of one of the displayed user vehicle configuration settings; and retrieve the selected user configuration settings from the data storage.

Example 7 includes the subject matter of any of Examples 1-6, and wherein to receive the selection of one of the displayed user vehicle configuration settings comprises to receive a selection of a seat location within the vehicle.

Example 8 includes the subject matter of any of Examples 1-7, and further including a display, wherein the vehicle configuration management module to display a selection of a plurality of selectable user vehicle configuration settings stored in the data storage on the display; receive a selection of one of the displayed user vehicle configuration settings; determine a user configuration settings identifier for the selected user vehicle configuration setting, wherein the communication module to transmit the user configuration settings identifier to the in-vehicle computing system of the vehicle.

Example 9 includes the subject matter of any of Examples 1-8, and wherein the user vehicle configuration settings comprises at least one of user configuration settings to adjust an ergonomic control of the vehicle, user configuration settings to adjust an comfort control of the vehicle, user configuration settings to adjust an mechanical control of the vehicle.

Example 10 includes the subject matter of any of Examples 1-9, and further including a display, wherein the vehicle configuration management module to display the user configuration settings on the display; and receive a selection of a user configuration setting of the displayed user configuration settings, wherein the communication module to transmit the user vehicle configuration setting to the in-vehicle computing system of the vehicle.

Example 11 includes the subject matter of any of Examples 1-10, and wherein the vehicle configuration management module to request vehicle configuration settings from the in-vehicle computing system, the vehicle configuration settings identifying current settings of vehicle occupant controls managed by the in-vehicle computing system of the vehicle; receive the vehicle configuration settings from the in-vehicle computing system using the communication module; and store the vehicle configuration settings in the data storage.

Example 12 includes the subject matter of any of Examples 1-11, and wherein the vehicle configuration management module to store the vehicle configuration settings in association with a vehicle identifier that identifies the vehicle.

Example 13 includes the subject matter of any of Examples 1-12, and wherein the vehicle configuration management module to store the vehicle configuration settings in association with a user identifier that identifies a user of the mobile communication device.

Example 14 includes the subject matter of any of Examples 1-13, and wherein the vehicle configuration management module to store the vehicle configuration settings in association with a priority identifier that identifies the priority of the vehicle configuration settings relative to other vehicle configuration settings.

Example 15 includes an in-vehicle computing system of a vehicle for managing vehicle configuration settings. The in-vehicle computing system includes a communication module to receive user vehicle configuration settings from a mobile communication device, the user vehicle configuration settings comprising data usable by the in-vehicle computing system to configure one or more vehicle occupant controls of the vehicle that are managed by the in-vehicle system; and a vehicle configuration control module to adjust at least one vehicle occupant control of the vehicle as a function of the user vehicle configuration settings.

Example 16 includes the subject matter of Example 15, and wherein the vehicle configuration control module is to generate a vehicle authorization signal in response to activation of a component of the vehicle and the communication module is to transmit the vehicle authorization signal to the mobile communication device to inform the mobile communication device that the vehicle configuration settings may be adjusted.

Example 17 includes the subject matter of any of Examples 15 and 16, and wherein the component of the vehicle is one of a door handle, a break, and an ignition switch.

Example 18 includes the subject matter of any of Examples 15-17, and further including a data storage to store vehicle configuration settings, wherein the user vehicle configuration settings comprises a user vehicle configuration settings identifier, and wherein the in-vehicle computing system to retrieve a vehicle configuration settings from the data storage corresponding to the user vehicle configuration settings identifier and adjust the at least one vehicle occupant control as a function of the retrieved vehicle configuration settings.

Example 19 includes the subject matter of any of Examples 15-18, and wherein the vehicle configuration control module comprises an ergonomic control module to adjust at least one ergonomic control of the vehicle as a function of the user vehicle configuration settings.

Example 20 includes the subject matter of any of Examples 15-19, and wherein the vehicle configuration control module comprises an comfort control module to adjust at least one comfort control of the vehicle as a function of the user vehicle configuration settings.

Example 21 includes the subject matter of any of Examples 15-20, and wherein the vehicle configuration control module comprises an mechanical control module to adjust at least one mechanical control of the vehicle as a function of the user vehicle configuration settings.

Example 22 includes the subject matter of any of Examples 15-21, and wherein the communication module to receive an additional user vehicle configuration settings from an additional mobile communication device, the vehicle configuration control module to resolve a priority conflict between the user vehicle configuration settings and the additional user vehicle configuration settings to determine a final user vehicle configuration settings and adjust at least one vehicle occupant control as a function of the final vehicle configuration settings.

Example 23 includes the subject matter of any of Examples 15-22, and wherein the vehicle configuration control module is to resolve the priority conflict as a function of a priority identifier received with each user vehicle configuration settings.

Example 24 includes the subject matter of any of Examples 15-23, and wherein the communication module to receive a request for vehicle configuration settings from the mobile communication device; and the in-vehicle computing system to determine current vehicle configuration settings of the vehicle in response to the request and transmit, using the communication module, the current vehicle configuration settings to the mobile communication device.

Example 25 includes the subject matter of any of Examples 15-24, and wherein the in-vehicle computing system to store the current vehicle configuration settings in a data storage of the in-vehicle computing system.

Example 26 includes the subject matter of any of Examples 15-25, and wherein the in-vehicle computing system to store the current vehicle configuration settings in the data storage in association with a settings identifier.

Example 27 includes the subject matter of any of Examples 15-26, and wherein in-vehicle computing system to determine at least one of an ergonomic control setting, a comfort control setting, and a mechanical control setting of the vehicle.

Example 28 includes a method for remotely configuring vehicle configuration settings using a mobile communication device. The method includes retrieving user vehicle configuration settings from a data storage of the mobile communication device, the user vehicle configuration settings to configure vehicle occupant controls managed by an in-vehicle computing system of the vehicle; and transmitting the user vehicle configuration settings to the in-vehicle computing system to configure the vehicle occupant controls.

Example 29 includes the subject matter of Example 28, and further including establishing a communication connection with the in-vehicle computing system, wherein retrieving user vehicle configuration settings comprises automatically retrieving the user vehicle configuration settings in response to establishment of the communication connection.

Example 30 includes the subject matter of any of Examples 28 and 29, and further including receiving a configuration authorization signal from the in-vehicle computing system indicative that a component of the vehicle has been activated, and wherein retrieving user vehicle configuration settings comprises automatically retrieving the user vehicle configuration settings in response to receiving the configuration authorization signal.

Example 31 includes the subject matter of any of Examples 28-30, and wherein retrieving the user vehicle configuration settings comprises determining a vehicle identifier for the vehicle, and retrieving the user configuration settings as a function of the vehicle identifier.

Example 32 includes the subject matter of any of Examples 28-31, and wherein determining the vehicle identifier comprises receiving the vehicle identifier from the in-vehicle computing system.

Example 33 includes the subject matter of any of Examples 28-32, and wherein retrieving the user vehicle configuration settings comprises receiving a selection of a user vehicle configuration settings from a plurality of selectable user vehicle configuration settings stored on the mobile communication device; and retrieving the selected user configuration settings.

Example 34 includes the subject matter of any of Examples 28-33, and wherein receiving a selection of a user vehicle configuration settings comprises receiving a selection of a seat location within the vehicle.

Example 35 includes the subject matter of any of Examples 28-34, and wherein retrieving the user vehicle configuration settings comprises receiving a selection of a user vehicle configuration settings from a plurality of selectable user vehicle configuration settings stored on the mobile communication device; determining a user configuration settings identifier for the selected user vehicle configuration settings; and transmitting the user configuration settings identifier to the in-vehicle computing system of the vehicle.

Example 36 includes the subject matter of any of Examples 28-35, and wherein transmitting the user vehicle configuration settings comprises transmitting user vehicle configuration settings that adjust an ergonomic control of the vehicle.

Example 37 includes the subject matter of any of Examples 28-36, and wherein transmitting the user vehicle configuration settings comprises transmitting user vehicle configuration settings that adjust a comfort control of the vehicle.

Example 38 includes the subject matter of any of Examples 28-37, and wherein transmitting the user vehicle configuration settings comprises transmitting user vehicle configuration settings that adjust a mechanical control of the vehicle.

Example 39 includes the subject matter of any of Examples 28-38, and further including displaying the user configuration settings on a display of the mobile communication device; and receiving, on the mobile communication device, a selection of a user configuration setting of the user configuration settings; and wherein transmitting the user vehicle configuration settings comprises transmitting the selected user configuration setting.

Example 40 includes the subject matter of any of Examples 28-39, and further including requesting vehicle configuration settings from the in-vehicle computing system, the vehicle configuration settings identifying current settings of vehicle occupant controls managed by the in-vehicle computing system of the vehicle; receiving, on the mobile communication device, the vehicle configuration settings from the in-vehicle computing system; and storing the vehicle configuration settings on the mobile communication device.

Example 41 includes the subject matter of any of Examples 28-40, and wherein storing the vehicle configuration settings comprises storing the vehicle configuration settings in association with a vehicle identifier that identifies the vehicle.

Example 42 includes the subject matter of any of Examples 28-41, and wherein storing the vehicle configuration settings comprises storing the vehicle configuration settings in association with a user identifier that identifies a user of the mobile communication device.

Example 43 includes the subject matter of any of Examples 28-42, and wherein storing the vehicle configuration settings comprises storing the vehicle configuration settings in association with a priority identifier that identifies the priority of the vehicle configuration settings relative to other vehicle configuration settings.

Example 44 includes a mobile communication device for remotely configuring vehicle configuration settings of a vehicle. The mobile communication device includes a processor and a memory having stored therein a plurality of instructions that when executed by the processor cause the computing device to perform the method of any of Examples 28-43.

Example 45 includes one or more machine readable media comprising a plurality of instructions stored thereon that in response to being executed result in a mobile computing device performing the method of any of Examples 28-43.

Example 46 includes a method for managing vehicle configuration settings of a vehicle. The method includes receiving, with an in-vehicle computing system of the vehicle, user vehicle configuration settings from a mobile communication device, the user vehicle configuration settings comprising data usable by the in-vehicle computing system to configure one or more vehicle occupant controls managed by the in-vehicle system; and adjusting, using the in-vehicle computing system, at least one vehicle occupant control of the vehicle as a function of the user vehicle configuration settings.

Example 47 includes the subject matter of Example 46, and wherein the plurality of instructions further result in the in-vehicle computing system generating transmitting a vehicle authorization signal to the mobile communication device in response to activation of a component of the vehicle, the vehicle authorization signal informing the mobile communication device that the vehicle configuration settings may be adjusted.

Example 48 includes the subject matter of any of Examples 46 and 47, and wherein the component of the vehicle is one of a door handle, a break, and an ignition switch.

Example 49 includes the subject matter of any of Examples 46-48, and wherein receiving the user vehicle configuration settings comprises receiving a user vehicle configuration settings identifier from the mobile communication device; and retrieving a vehicle configuration settings from a data storage of the in-vehicle computing system corresponding to the user vehicle configuration settings identifier, wherein adjusting the at least one vehicle occupant control comprises adjusting the at least one vehicle occupant control as a function of the retrieved vehicle configuration settings.

Example 50 includes the subject matter of any of Examples 46-49, and wherein adjusting the at least one vehicle occupant control comprises adjusting an ergonomic control of the vehicle as a function of the user vehicle configuration settings.

Example 51 includes the subject matter of any of Examples 46-50, and wherein adjusting the at least one vehicle occupant control comprises adjusting an comfort control of the vehicle as a function of the user vehicle configuration settings.

Example 52 includes the subject matter of any of Examples 46-51, and wherein adjusting the at least one vehicle occupant control comprises adjusting an mechanical control of the vehicle as a function of the user vehicle configuration settings.

Example 53 includes the subject matter of any of Examples 46-52, and further including receiving, with the in-vehicle computing system, an additional user vehicle configuration settings from another mobile communication device; and resolving a priority conflict between the user vehicle configuration settings and the additional user vehicle configuration settings to determine a final user vehicle configuration settings, wherein adjusting the at least one vehicle occupant control comprises adjusting the at least one vehicle occupant control as a function of the final vehicle configuration settings.

Example 54 includes the subject matter of any of Examples 46-53, and wherein resolving the priority conflict comprises resolving the priority conflict between the user vehicle configuration settings and the additional user vehicle configuration settings as a function of a priority identifier received with each user vehicle configuration settings.

Example 55 includes the subject matter of any of Examples 46-54, and further including receiving, with the in-vehicle computing system, a request for vehicle configuration settings from the mobile communication device; determining, with the in-vehicle computing system, current vehicle configuration settings of the vehicle in response to the request; and transmitting the current vehicle configuration settings to the mobile communication device.

Example 56 includes the subject matter of any of Examples 46-55, and further including storing the current vehicle configuration settings in a data storage of the in-vehicle computing system.

Example 57 includes the subject matter of any of Examples 46-56, and wherein storing the current vehicle configuration settings comprises storing the storing the current vehicle configuration settings in a data storage of the in-vehicle computing system in association with a settings identifier.

Example 58 includes the subject matter of any of Examples 46-57, and wherein determining the current vehicle configuration settings of the vehicle comprises determining at least one of an ergonomic control setting, a comfort control setting, and a mechanical control setting of the vehicle.

Example 59 includes an in-vehicle computing system for managing vehicle configuration settings of a vehicle. The in-vehicle computing system includes a processor and a memory having stored therein a plurality of instructions that when executed by the processor cause the computing device to perform the method of any of Examples 46-58.

Example 60 includes one or more machine readable media including a plurality of instructions stored thereon that in response to being executed result in an in-vehicle computing system of a vehicle performing the method of any of Examples 46-58.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

The invention claimed is:

1. A mobile communication device for remotely configuring vehicle configuration settings of a vehicle, the mobile communication device comprising:
   a data storage having stored therein a plurality of sets of user vehicle configuration settings to facilitate control of a plurality of vehicle occupant controls of the vehicle, wherein each set of the user vehicle configuration settings is associated with a corresponding user of the vehicle and comprises data usable by an in-vehicle computing system of the vehicle to configure each vehicle occupant control of the plurality of vehicle occupant controls of the vehicle based on a previous configuration of the vehicle occupant controls by the corresponding user; and a processor to establish a vehicle configuration management module, wherein the vehicle configuration management module is to:
transmit a request for vehicle configuration settings from the in-vehicle computing system, wherein the vehicle configuration settings identify current settings of the plurality of vehicle occupant controls and are usable by the in-vehicle computing system to set a configuration of at least one component of the vehicle;
receive the requested vehicle configuration settings from the in-vehicle computing system;
store the vehicle configuration settings in the data storage
retrieve a set of user vehicle configuration settings from the data storage; and
transmit the retrieved set of user vehicle configuration settings to the in-vehicle computing system to configure the vehicle occupant controls.

2. The mobile communication device of claim 1, wherein the vehicle configuration management module is to automatically retrieve and transmit the set of user vehicle configuration settings in response to establishment of a communication connection with the in-vehicle computing system.

3. The mobile communication device of claim 1, wherein the vehicle configuration management module is to automatically retrieve and transmit the set of user vehicle configuration settings in response to receiving a configuration authorization signal from the in-vehicle computing system indicative that a component of the vehicle has been activated.

4. The mobile communication device of claim 1, wherein the vehicle configuration management module to determine a vehicle identifier for the vehicle and retrieve the set of user vehicle configuration settings from the data storage based at least in part on the vehicle identifier.

5. The mobile communication device of claim 1, further comprising a display, wherein the vehicle configuration management module to:
display, via a graphical user interface on the display, one or more user selectable seat locations of the vehicle stored in the data storage;
receive a seat location selection selected via the graphical user interface on the display from one of the user selectable seat locations of the vehicle; and
retrieve a set of user vehicle configuration settings from the data storage corresponding to the seat location selection.

6. The mobile communication device of claim 1, further comprising a display, wherein the vehicle configuration management module to:
display, via a graphical user interface (GUI) on the display, one or more user selectable user vehicle configuration settings stored in the data storage;
receive a setting selection selected via the graphical user interface on the display from one of the selectable user vehicle configuration settings;
display, via the GUI, one or more setting options corresponding to the setting selection;
receive a selected setting option of one of the setting options selected via the GUI on the display;
determine a user configuration settings identifier in response to the selected setting option; and
transmit the user configuration settings identifier to the in-vehicle computing system of the vehicle.

7. The mobile communication device of claim 1, wherein each set of user vehicle configuration settings comprises at least one of user configuration settings to adjust an ergonomic control of the vehicle, user configuration settings to adjust an comfort control of the vehicle, user configuration settings to adjust an mechanical control of the vehicle.

8. An in-vehicle computing system of a vehicle for managing vehicle configuration settings, the in-vehicle computing system comprising:
a processor to establish a communication module and a vehicle configuration control module, wherein:
the communication module is to receive, from a mobile computing device, a set of user vehicle configuration settings from a plurality of sets of user vehicle configuration settings stored at the mobile communication device, wherein the set of user vehicle configuration settings is associated with a corresponding user of the vehicle and comprises data usable by the in-vehicle computing system to configure one or more vehicle occupant controls of the vehicle that are managed by the in-vehicle system based on a previous configuration of the vehicle occupant controls by the corresponding user; and
the vehicle configuration control module is to adjust at least one vehicle occupant control of the vehicle as a function of the set of user vehicle configuration settings,
wherein the communication module is further to receive a request for vehicle configuration settings from the mobile communication device,
wherein the vehicle configuration settings are usable by the in-vehicle system to set a configuration of at least one component of the vehicle, and
wherein the in-vehicle computing system is further to determine current vehicle configuration settings of the vehicle in response to the request and transmit, using the communication module, the current vehicle configuration settings to the mobile communication device.

9. The in-vehicle computing system of claim 8, wherein the vehicle configuration control module is to generate a vehicle authorization signal in response to activation of a component of the vehicle and the communication module is to transmit the vehicle authorization signal to the mobile communication device to inform the mobile communication device that the vehicle configuration settings may be adjusted.

10. The in-vehicle computing system of claim 9, wherein the component of the vehicle is one of a door handle, a break, and an ignition switch.

11. The in-vehicle computing system of claim 8, further comprising a data storage to store vehicle configuration settings,
wherein the set of user vehicle configuration settings comprises a user vehicle configuration settings identifier, and
wherein the in-vehicle computing system to retrieve vehicle configuration settings from the data storage corresponding to the user vehicle configuration settings identifier and adjust the at least one vehicle occupant control as a function of the retrieved vehicle configuration settings.

12. The in-vehicle computing system of claim 8, wherein the vehicle configuration control module comprises at least one of an ergonomic control module to adjust at least one ergonomic control of the vehicle as a function of the set of user vehicle configuration settings, a comfort control module to adjust at least one comfort control of the vehicle as a function of the set of user vehicle configuration settings, and a mechanical control module to adjust at least one mechanical control of the vehicle as a function of the set of user vehicle configuration settings.

13. The in-vehicle computing system of claim 8, wherein the communication module to receive an additional set of user vehicle configuration settings from an additional mobile communication device,
the vehicle configuration control module to resolve a priority conflict between the set of user vehicle configuration settings and the additional user vehicle configuration settings to determine a final user vehicle configuration settings and adjust at least one vehicle occupant control as a function of the final vehicle configuration settings.

14. The in-vehicle computing system of claim 13, wherein the vehicle configuration control module is to resolve the priority conflict as a function of a priority identifier received with each set of user vehicle configuration settings.

15. One or more machine readable storage media comprising a plurality of instructions stored thereon that, in response to being executed, result in a mobile computing device:
automatically retrieving a set of user vehicle configuration settings from a plurality of sets of user vehicle configuration settings stored in a data storage of the mobile communication device to facilitate control of a plurality of vehicle occupant controls of a vehicle, wherein each set of user vehicle configuration settings is associated with a corresponding user of the vehicle and comprises data usable by an in-vehicle computing device of the vehicle to configure each vehicle occupant control of the plurality of vehicle occupant controls of the vehicle based on a previous configuration of the vehicle occupant controls by the corresponding user; and
transmitting the set of user vehicle configuration settings to the in-vehicle computing system to configure the vehicle occupant controls, and
requesting vehicle configuration settings from the in-vehicle computing system, wherein the vehicle configuration settings identify current settings of vehicle occupant controls managed by the in-vehicle computing system of the vehicle and are usable by the in-vehicle computing system to set a configuration of at least one component of the vehicle;
receiving the requested vehicle configuration settings from the in-vehicle computing system; and
storing the vehicle configuration settings in the data storage of the mobile communication device.

16. The one or more machine readable storage media of claim 15, wherein the plurality of instructions further result in the mobile computing device:
establishing a communication connection with the in-vehicle computing system,
wherein automatically retrieving the set of user vehicle configuration settings comprises automatically retrieving the set of user vehicle configuration settings in response to establishment of the communication connection.

17. The one or more machine readable storage media of claim 15, wherein the plurality of instructions further result in the mobile computing device:
receiving a configuration authorization signal from the in-vehicle computing system indicative that a component of the vehicle has been activated, and
wherein automatically retrieving the set of user vehicle configuration settings comprises automatically retrieving the set of user vehicle configuration settings in response to receiving the configuration authorization signal.

18. The one or more machine readable storage media of claim 15, wherein transmitting the set of user vehicle configuration settings comprises transmitting the set of user vehicle configuration settings that adjust at least one of an ergonomic control of the vehicle, a comfort control of the vehicle, and a mechanical control of the vehicle.

19. The one or more machine readable storage media of claim 15, further comprising:
wherein storing the vehicle configuration settings comprises storing the vehicle configuration settings on the mobile communication device in association with a vehicle identifier that identifies the vehicle and in association with a priority identifier that identifies the priority of the vehicle configuration settings relative to other vehicle configuration settings.

20. One or more machine readable storage media comprising a plurality of instructions stored thereon that, in response to being executed, result in an in-vehicle computing system:
receiving a set of user vehicle configuration settings from a plurality of sets of user vehicle configuration settings stored at a mobile communication device, wherein the set of user vehicle configuration settings is associated with a corresponding user of the vehicle and comprises data usable by the in-vehicle computing system to configure one or more vehicle occupant controls managed by the in-vehicle system based on a previous configuration of the vehicle occupant controls by the corresponding user;
adjusting, using the in-vehicle computing system, at least one vehicle occupant control of the vehicle as a function of the set of user vehicle configuration settings;
receiving a request for vehicle configuration settings from the mobile communication device, wherein the vehicle configuration settings are usable by the in-vehicle computing system to set a configuration of at least one component of the vehicle;
determining current vehicle configuration settings of the vehicle in response to the request; and
transmitting the current vehicle configuration settings to the mobile communication device.

21. The one or more machine readable storage media of claim 20, wherein the plurality of instructions further result in the in-vehicle computing system generating and transmitting a vehicle authorization signal to the mobile communication device in response to activation of a component of the vehicle, the vehicle authorization signal informing the mobile communication device that the vehicle configuration settings may be adjusted.

22. The one or more machine readable storage media of claim 21, wherein the component of the vehicle is one of a door handle, a break, and an ignition switch.

23. The one or more machine readable storage media of claim 20, further comprising:
receiving, with the in-vehicle computing system, an additional set of user vehicle configuration settings from another mobile communication device; and
resolving a priority conflict between the set of user vehicle configuration settings and the additional set of user vehicle configuration settings to determine a final set of user vehicle configuration settings,
wherein adjusting the at least one vehicle occupant control comprises adjusting the at least one vehicle occupant control as a function of the final set of vehicle configuration settings.

24. The one or more machine readable storage media of claim 20, wherein determining the current vehicle configuration settings of the vehicle comprises determining at least one of an ergonomic control setting, a comfort control setting, and a mechanical control setting of the vehicle.

25. The mobile communication device of claim 1, wherein:
- to receive the requested vehicle configuration settings comprises to receive an updated subset of the vehicle configuration settings that changed within a predefined time period without a remainder of the vehicle configuration settings that did not change within the predefined time period; and
- to store the vehicle configuration settings comprises to store the updated subset of the vehicle configuration settings.

26. The in-vehicle computing system of claim 8, wherein:
- to determine the current vehicle configuration settings comprises to determine an updated subset of the vehicle configuration settings that changed during a predefined time period; and
- to transmit the current vehicle configuration settings comprises to transmit the updated subset of the vehicle configuration settings without a remainder of the vehicle configuration settings that did not change within the predefined time period.

\* \* \* \* \*